(12) United States Patent
Benassi et al.

(10) Patent No.: US 6,913,555 B2
(45) Date of Patent: Jul. 5, 2005

(54) CVT TRANSMISSION FOR MOTOR VEHICLES, IN PARTICULAR FOR AGRICULTURAL TRACTORS

(75) Inventors: Giancarlo Benassi, Modena (IT); Giorgio Bordini, Santa Cruz de Tenerife (ES)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/601,028

(22) Filed: Jun. 20, 2003

(65) Prior Publication Data

US 2004/0023740 A1 Feb. 5, 2004

(30) Foreign Application Priority Data

Jul. 5, 2002 (IT) ..................................... BO2002A0443

(51) Int. Cl.[7] .............................................. F16H 37/02
(52) U.S. Cl. ..................... 475/218; 475/211; 475/219
(58) Field of Search .................................. 475/211, 218, 475/219, 25, 29; 180/374, 376

(56) References Cited

U.S. PATENT DOCUMENTS

| | | | | | |
|---|---|---|---|---|---|
| 4,402,237 | A | * | 9/1983 | Tomlinson | 475/211 |
| 4,589,303 | A | * | 5/1986 | Roberts | 475/211 |
| 5,980,414 | A | * | 11/1999 | Larkin | 475/211 |
| 6,447,422 | B1 | * | 9/2002 | Haka | 475/211 |

* cited by examiner

*Primary Examiner*—Ha Ho
(74) *Attorney, Agent, or Firm*—John William Stader

(57) ABSTRACT

A CVT transmission for agricultural tractors which envisages equipment for continuous variation of the motion by means of an epicyclic gear train. In the CVT transmission the input of the motion from an engine occurs in a direction substantially that is parallel to an axis of longitudinal symmetry of the tractor, whilst the axes of a shafts, respectively, between which there takes place variation of the transmission ratio, are transverse with respect to the axis of longitudinal symmetry of the tractor.

16 Claims, 7 Drawing Sheets

CVT TRANSMISSION FOR MOTOR VEHICLES, IN PARTICULAR FOR AGRICULTURAL TRACTORS

BACKGROUND OF INVENTION

1. Field of Invention

The present invention relates to a continuously variable transmission (CVT) for motor vehicles, in particular for agricultural tractors.

2. Background of Prior Art

In the tractor field, transmissions are known in which a continuous control of speed is obtained, said transmissions being referred to as variable-speed drives or continuously variable transmissions (CVTs). In other words, in these transmissions the speed of the motor vehicle can be regulated, without any discontinuity, over the entire the range from the maximum speed of forward movement to the maximum speed of backward movement or maximum speed in reverse. In particular, there are known solutions in which the CVT comprises equipment for continuous variation of motion in terms of torque and of speed delivered. The continuous variation is obtained between two shafts and a differential by means of a first mechanical device with fixed transmission ratio and a second mechanical device with variable transmission ratio; set between the first device and the second device is an epicyclic gear train.

However, in the known solutions, the transmissions develop in the direction of the length of the motor vehicle, thus rendering them unsuitable for low-power tractors, in which there is, instead, the requirement of maximum compactness in a transverse direction.

The present invention, therefore, belongs within the aforesaid framework and leads to a series of advantages, which will emerge clearly from the contents of the ensuing detailed description, advantages which are linked, above all, to the extreme compactness of the transmission in a transverse direction.

SUMMARY OF THE INVENTION

A CVT transmission for agricultural tractors which envisages equipment for continuous variation of the motion by means of an epicyclic gear train. In the CVT transmission the input of the motion from an engine occurs in a direction substantially that is parallel to an axis of longitudinal symmetry of the tractor, whilst the axes of a shafts, respectively, between which there takes place variation of the transmission ratio, are transverse with respect to the axis of longitudinal symmetry of the tractor.

OBJECTS OF THE INVENTION

The object of the present CVT transmission is a longitudinal internal-combustion engine and perpendicular gear change in a particular embodiment.

It is a further object of the present invention to have large distances between centres and are possible between shafts carrying the pulleys for belts or chains, the said distances between centres being adequate for the torques to be transmitted by friction, and this without causing any increase in the critical cross section (the transverse one) of the tractor body, at the transmission.

It is a further object of the present invention that the distances between centres of the shafts develop in a longitudinal direction with respect to the axis of the tractor, a direction in which there do not exist restrictive dimensional constraints.

It is a further object of the present invention to accommodate the entire assembly of the transmission in an area set back with respect to the driving seat, so that the transverse dimensions will not pose obstacles to comfort, manoeuvrability of the controls, ergonomic as well as other aspects.

It is a further object of the present invention that the axes of the various shafts are preferably arranged substantially in the form of a quincunx, so as to exploit the entire height of the guards for accommodating more axes.

It is a further object of the present invention that the speed-variator assembly is set in cantilever fashion on the primary and secondary shafts, so as to enable it to be housed in a guard conveniently separate from the rest of the gears, a guard that has a readily accessible outer side; this involves the possibility of adopting a variator assembly operating with dry lubrication or else with oil-bath lubrication, and, in any case, the maintenance or disassembly of the pulleys, of the belt or chain means, as likewise of the transmission-ratio control assembly, prove extremely convenient, in so far as the assemblies are mounted on shafts in cantilever fashion, as likewise is the arrangement of the devices for actuation and control of the variator.

It is a further object of the present invention that the shafts of the transmission prove more rigid, in so far as the spans are smaller than in a solution with shafts supported at their ends.

It is a further object of the present invention that the kinematic elements characterising the kinetic performance of the entire transmission comprise the crown-wheel-and-pinion assembly, the ratio of which can range from values lower than 1 to values higher than or equal to 1, enables adaptation of internal-combustion engines having different characteristics, as well as meeting of the requirements of variants as regards the speed or characteristics on the ground; the gear train conveniently enables variation of the ratio between the speed of forward movement and of backward movement; the axis of the idle gear belonging to the gear train can be mobile to enable additional transmission ratios and consequently, the assemblies that involve high costs (variator device, epicyclic gear train) remain the same as the types of engines or the expected speeds on the ground vary, in such a way that accurate optimisation between performance levels and types of engines is achieved via variations made in low-cost elements; consequently, it is possible to imagine a transmission having a variator device and an epicyclic gear train that are always the same for all the variants of vehicles of one and the same range, whilst, according to the power, it is possible to change either the crown-wheel-and-pinion assembly at input or else the characteristics of the gear train designed for transmission of the non-variable portion of the power.

It is a further object of the present invention to reduce of the overall dimensions of the transmission.

It is a further object of the present invention to reduce of the power involved and elimination of the phenomenon of "creeping".

It is a further object of the present invention to make possible the towing of the motor vehicle in conditions of emergency.

It is a further object of the present invention to direct take-off of the four-wheel drive on the driven crown gear of the differential.

It is a further object of the present invention to PTO synchronised directly by the driven crown gear of the differential.

It is a further object of the present invention to line of motion of the rear central PTO that passes between the two wheels mounted on the differential assembly.

It is a further object of the present invention to transmission clutch and PTO clutch either separate or integrated (double clutch).

It is a further object of the present invention to possible torque limiter on the input shaft of the motion.

It is a further object of the present invention to pre-arrangement for optimised system of control of the power of the engine M.

BRIEF DESCRIPTION OF THE DRAWINGS

The present invention will now be described with reference to the annexed drawings, which illustrate some non-limiting examples of embodiment, in which.

DETAILED DESCRIPTION OF THE INVENTION

Figure 1:
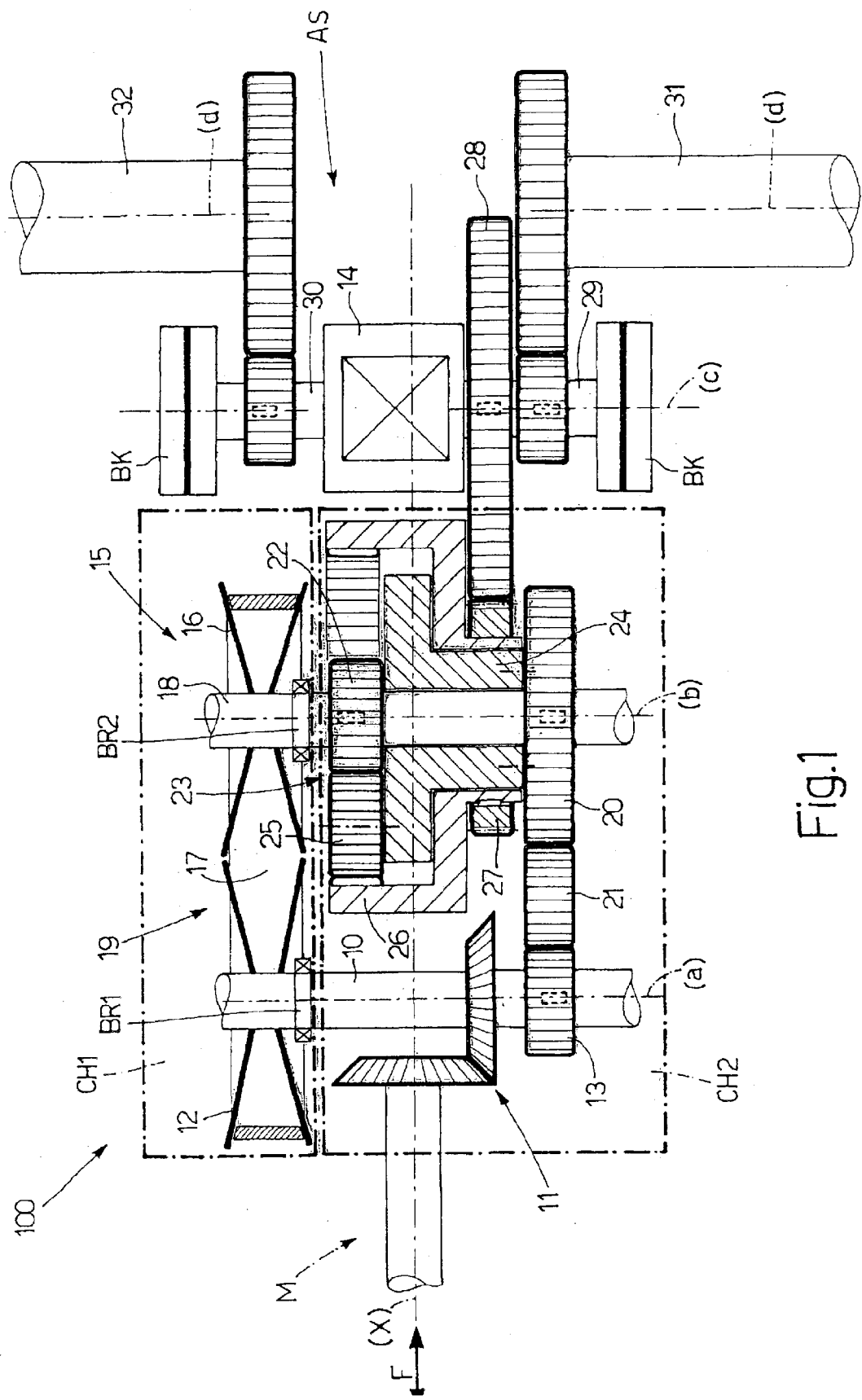
FIG. 1 illustrates a plan view of a first embodiment of the CVT that forms the subject of the present invention.

In a transmission 100, illustrated in FIG. 1, the mechanical power produced by an engine M of a tractor (not illustrated in its entirety) is transmitted to a first shaft 10 by means of a crown wheel and pinion 11. The shaft 10 envisages an axis (a) of longitudinal symmetry set perpendicular to the central axis (X) of the motor vehicle (not represented as a whole).

Figure 3:
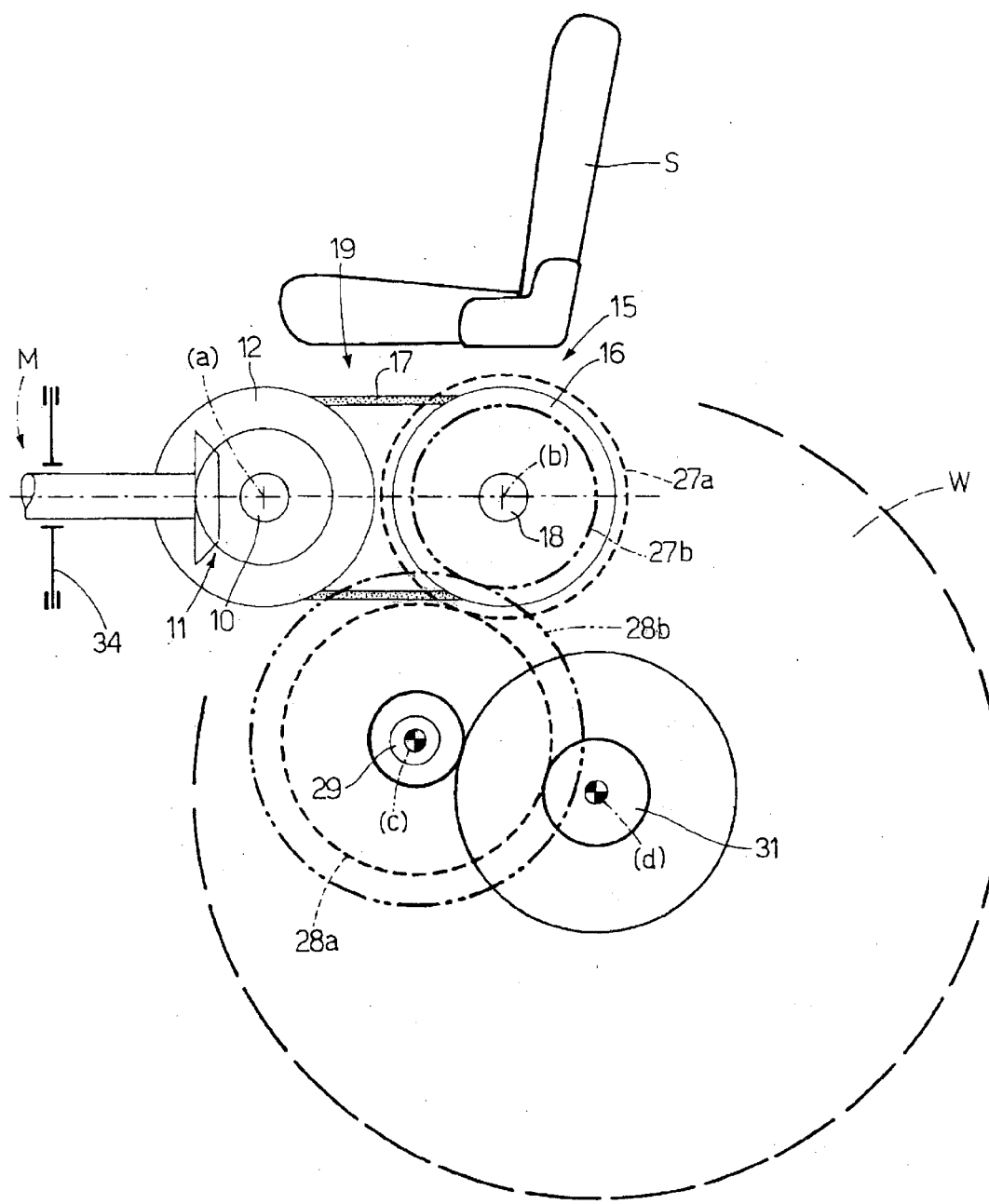
FIG. 3 illustrates a side view of the embodiment illustrated in FIG. 2.
Figure 4:
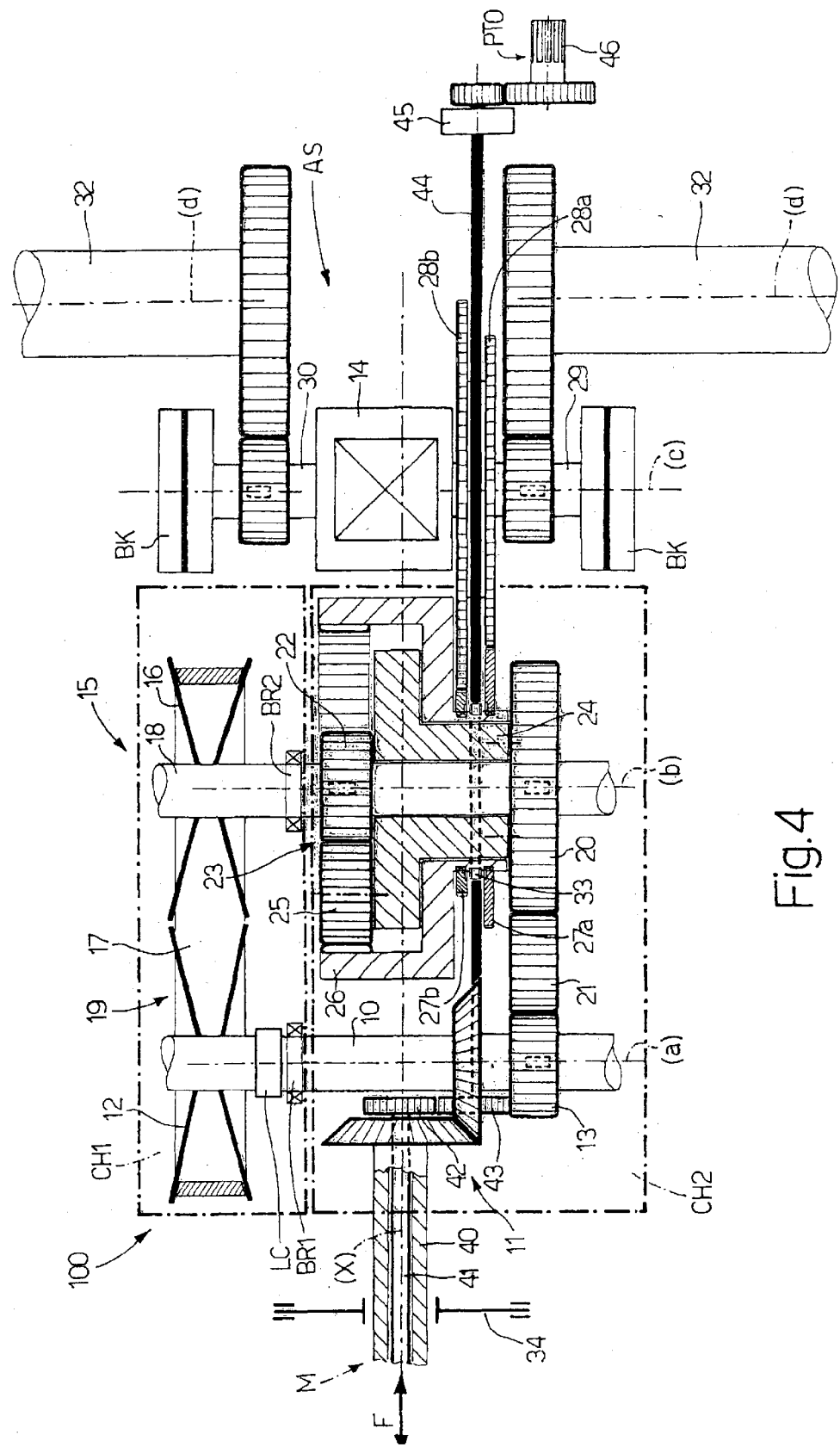
FIG. 4 illustrates a plan view of a transmission which envisages a shaft for transferring motion to a power take-off (PTO).

In addition, the shaft 10 envisages two modes of operation, which co-operate with one another, for transferring the power received to the rear wheels W (FIG. 3). In a first mode a pulley 12 is used, whilst in the second mode a gear wheel 13 is envisaged. Furthermore, the motor vehicle is designed to move in the two directions of movement (forward movement and backward movement), which are represented by the double-headed arrow F.

Set between the shaft 10 and a differential 14 belonging to a rear axle AS is equipment 15 for continuous variation of motion.

In effect, the pulley 12 referred to above drives a pulley 16 by means of a belt (or chain, not represented) 17. The pulley 16 is fitted on a shaft 18, the axis (b) of longitudinal symmetry of which is parallel to the axis (a) of the shaft 10 and is hence also transverse to the axis (X) of the motor vehicle.

The set of two pulleys 12 and 16 and of the belt (or chain) 17 constitutes a transmission device 19 with continuous variation of the drive ratio. For example, the transmission device 19 can be of the type with expandable pulleys like the one represented in FIG. 1, driven by an electrical or hydraulic device (not illustrated in the attached figures).

At the same time, the gear wheel 13 drives a gear wheel 20 via an idle gear 21.

Fixed on the same shaft 18 on which the pulley 16 is fitted is a central gear 22 of an epicyclic gear train 23. In turn, the gear wheel 20 drives a spider 24 of the epicyclic gear train 23. Associated to the spider 24, in a known way, is a plurality of planetary gears 25 (only one of which is visible in FIG. 1), the teeth of which mesh with the internal teeth of a crown gear 26.

Consequently, the speed of the crown gear 26 is the algebraic sum of the speeds of the gears 20 and 22, according to the well-known Willis' law.

The gear wheel 20 and the spider 24 associated thereto are set neutral on the shaft 18 and rotate about an axis (b) thanks to the meshing of the idle gear 21, which, as has already been said, draws its motion from the shaft 10 by means of the gear wheel 13.

A gear wheel 27, fixed to the crown gear 26, meshes with a gear wheel 28 (crown gear of the differential 14), which is designed to rotate about an a axis of longitudinal symmetry (c) of the differential (14), the axis (c) being parallel to the aforementioned axes (a) and (b).

Exiting from the differential 14 are two half-shafts 29 and 30, which drive, by means of final reducers according to the known art, the gear shafts 31 and 32 of the rear wheels (not illustrated) of axis (d). Each half-shaft 29, 30 is provided with a respective brake BK.

Summarising what has been said previously, we can say that the mechanical power transmitted from the shaft 10 to the shaft 18 is divided into two simultaneous paths: a first path for the gear wheels 13, 21 and 20, with fixed transmission ratio, and a second path, which refers to a transmission with variable ratio, comprising the device 19.

The division of the torque and of the speed, and hence of the power, between the two paths depends upon the transmission ratios and upon the fact that, in the epicyclic gear train 23, the torque on the central gear 22 is lower, and indeed much lower, than the torque on the crown gear 26 and the torque on the spider 24. Consequently, the torque transmitted through the transmission device 19 is far lower than the torque transmitted through the fixed-ratio path, i.e., through the gear wheels 13, 21, 20.

It is to be noted, incidentally, that the presence of the idle gear 21 is necessary for ensuring a concordant direction of rotation of the two shafts 10, 18, as is likewise guaranteed by the pulley device 19.

Furthermore, since the variation of the transmission ratio that can be achieved by the transmission device 19 can even reach the value of 6, the speed of the central gear can hence range from a value reduced by the factor 2.449 (i.e., the square root of 6) up to a value increased by the same factor 2.449.

By applying the Willis' law, with an appropriate choice of the fixed transmission ratios, it can be shown that, just through the control of the variable transmission ratio, the speed of the motor vehicle on the ground can be controlled.

In this way, it is possible to reach a zero speed, when the tractor makes a stop, or else proceeds at an ever-increasing speed (up to the design maximum) when the motor vehicle is proceeding with forward movement or with backward movement (also in this case, up to the design maximum).

In addition, the reversal of the direction of motion by means of the epicyclic gear train 23 is obtained without having to resort to the use of a particular supplementary device for reversal of motion.

As has been said, the variable transmission ratio, obtained by means of the device 19, can be controlled with hydraulic, mechanical or electrical means (not represented) belonging to the known art.

However, the logic of the speed control must be dedicated to the particular application.

The transverse arrangement of the axes (a), (b) and (c) with respect to the axis (X) of the motor vehicle 10 enables innumerable advantages to be achieved, such as for example: (1) The overall dimensions of the system develop prevalently in a longitudinal direction (along the axis X) so as to leave the cross section of the tractor body within dimensional limits that are very restricted and acceptable, such as the ones required by agricultural tractors, in particular in the area of positioning of the transmission 100, which is normally set underneath the driving seat (see also FIG. 3); (2) the relative position of the axes (a), (b) and (c) can be chosen according to innumerable configurations, in respect of the distances between centres according to design; i.e., the axes (a) and (b), respectively, of the transverse shafts 10 and 18 need not be subject to particular constraints of height, with respect to one another, so as to enable configurations of shafts 10, 18 set parallel to one another, but may be grouped together so as to exploit conveniently the ratio between the horizontal space and vertical space occupied by them; (3) the crown-wheel-and-pinion assembly 11 at input enables reduced overall dimensions as compared to the conventional configuration in so far as it is set on a very fast shaft of the engine M (4) the crown-wheel-and-pinion assembly 11 at input, as likewise the torque transmitted by the train of gears 13, 21, 20, enables advantages in terms of freedom of sizing of the variator device 19, as likewise of the epicyclic gear train 23, in so far as they represent flexible and low-cost means for operations of correction and compensation of the performance of the transmission 100, as the characteristics of the different power drives (or else of the specifications of use of the various versions of motor vehicles) vary, without having to diversify the central part of the transmission 100, a central part which is the one having the biggest impact in terms of investments and costs; (5) a first guard CH1, which houses the device 19 for continuous variation of motion, can be conveniently isolated from a second guard CH2, which contains within it the remaining parts of the transmission 100, so as to enable use of the transmission device 19, whether this is oil-lubricated or dry-lubricated, such as, for example, a device 19 of the type operating with rubber belts (or else belts made of a composite material); a further advantage is represented by the fact that the guards CH1, where the device 19 is housed, is readily accessible from outside, for inspections or maintenance operations.

As illustrated once again in FIG. 1, the bearings BR1 and BR2 for supporting the shaft 10 and the shaft 18, respectively, are set conveniently, in appropriate seats, on a wall P of the first guard CH1, the said wall P facing the second guard CH2.

In an embodiment that is not represented, the engine M, instead of being set longitudinally with respect to the axis (X), is set in a transverse direction with respect to the same axis (X) (hence parallel to the axes (a), (b) and (c)), whilst, as usual, a first guard CH1 is provided separate from a second guard CH2.

However, the equipment 19 described above presents some functional limits, such as absence of a clutch coupled to the engine M, which is not necessary in the conventional operations of starting and stopping of the movement but is advisable in particular conditions, such as, for example, in the event of a failure of the transmission, or else when there is the need for the motor vehicle to be towed with the engine not running, an operation which, otherwise, would not be possible.

The presence of a clutch would also be necessary in conditions of emergency, where by the term "emergency" is meant an overloading of the transmission or a loss of control by the system for regulating the speed.

It would also be useful to have a clutch for operations in which the power take-off (PTO) is activated and the motor vehicle is without a driver; in this case, a system of control of the speed on the ground that is not perfectly calibrated would bring the tractor to a condition defined in the sector jargon as "creeping", i.e., a more or less slow spontaneous movement, which is an undesirable phenomenon that the presence of a clutch in the transmission 100 could prevent.

Uniqueness of the transmission ratio between the crown gear 26 of the epicyclic gear train 23 and the gear 28 belonging to the differential 14; the said fixed ratio involves, in the event of high torques to the driving wheels of the tractor in concomitance with low speeds, high power values between the device 19 and the epicyclic gear train 23, notwithstanding relatively lowpower values transmitted to the ground.

Figure 2:
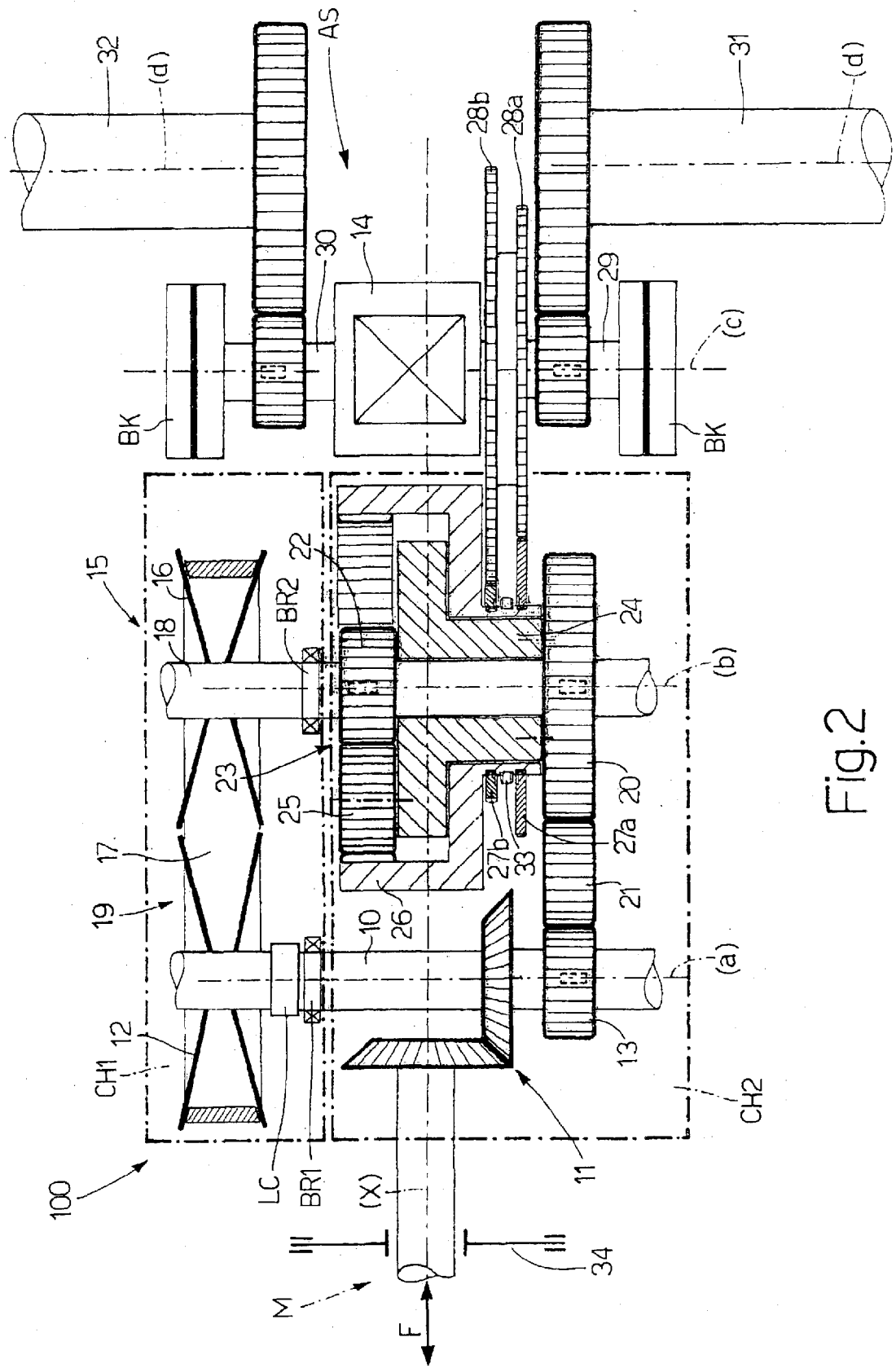
FIG. 2 illustrates a plan view of a second embodiment of the CVT that forms the subject of the present invention.

Consequently, in order to prevent the drawbacks referred to above, where their presence and degree could be prejudicial to the performance of the motor vehicle, in what follows there is set forth a second embodiment described with particular reference to FIGS. 2 and 3.

As compared to the first embodiment described with reference to FIG. 1, the second embodiment illustrated in FIGS. 2 and 3 offers the following variants:

Possibility of having a dual ratio on the final transmission to the differential 14. Hence, between the crown gear 26 of the epicyclic gear train 23 and the gear 28, which is, as has been said, the crown gear of the differential 14 there is provided a dual transmission ratio.

In effect, the power at output from the crown gear 26 is transferred to the differential 14 by means of a system with dual transmission ratio, also provided with neutral gear, comprising two pairs of gear wheels 27a, 28a and 27b, 28b (FIGS. 2 and 3).

The engaging of the gears 27a, 28a yields a first transmission ratio, whilst the meshing of the gears 27b, 28b yields a second transmission ratio to the rear wheels W of the motor vehicle.

Consequently, the most suitable transmission ratio can be selected, in a known way, through a sliding toothed shaft coupling 33 that can be displaced along the axis (b) manually, or else by means of a servo control (not represented).

As has been said, the toothed shaft coupling 33 can assume also a neutral position, in which it does not block either of the two gear wheels 27a, 27b on the shaft 18.

The transmission ratio obtained from the engaging of the gears 27b, 28b is suitable for working conditions characterised by low speed on the ground and high torques to the driving wheels (referred to as "LO" condition); instead, the transmission ratio obtained by meshing of the gears 27a, 28a is suitable for working conditions characterised by high speed on the ground and low torques to the rear wheels (referred to as "HI" condition).

The adoption of a dual transmission ratio involves a limitation of the torques and of the powers involved, and consequently enables limitation of the overall dimensions and hence of the costs and encumbrance of the members of the transmission. There is obtained, moreover, a limitation of the power lost as a result of the higher efficiency of the transmission. Furthermore, as has been said, it is possible to obtain also a neutral condition, which is useful both in normal stationary working conditions in order to prevent microspeed phenomena (the "creeping" referred to previously) and to enable convenient operations of towing in the event of breakdown of the transmission-control system, or else simply breakdown of the engine M.

There is moreover envisaged the presence of a clutch 34 on the transmission (FIGS. 2 and 3). In effect, a conventional clutch 34 can be useful for disconnecting the engine M from the transmission 100 in certain particular circumstances, such as the need for having to select the transmission ratio between the epicyclic gear train 23 and the differential 14 by means of the two pairs of gears 27a, 28a, and 27b, 28b, or else the need for having to select a neutral gear, which requires a front disengagement of the toothed shaft coupling 33, a manoeuvre which could be facilitated by the control of input speed to the transmission 100, precisely by means of the clutch 34 (FIGS. 2 and 3).

Furthermore, the clutch 34 may be useful in long periods of use of the PTO in conditions of immobility of the tractor, so as to prevent idle running of the transmission 100. Moreover, the presence of the clutch 34 can present advantages when it is necessary to tow the tractor in certain conditions of emergency or breakdown. The clutch 34 can function also as limiter of the torque delivered by the engine M.

As illustrated in FIG. 2, a torque limiter LC can also be provided on the shaft 10, "downstream" of the pulley 12 and immediately "upstream" of the bearing BR1.

As illustrated in FIG. 3, the axes (a), (b), (c) and (d) are located at the rear wheels W (only one wheel is visible in FIG. 3) and, in order to increase the compactness, are positioned underneath a seat S, on which the driver (not illustrated) sits.

Advantageously, but not necessarily, the axes (a), (b), (c) and (d) are arranged spatially according to a substantially quincuncial configuration so as to increase to the maximum the compactness of the transmission 100.

Furthermore, agricultural tractors may be characterised by the presence of power transmissions also to the front axis (not illustrated) in the type of transmission that is commonly referred to as "four-wheel drive".

The four-wheel drive must be synchronous with the transmission 100 previously illustrated with reference to the rear wheels W.

In addition, in the case of agricultural tractors, of particular importance is the use of the PTO.

As is known, in an agricultural tractor use may be made of supplementary PTOs in addition to the customary one set in the rear part of the tractor. It is possible for there to be the need, for example, of a PTO positioned centrally with respect to the transmission 100.

For the most part, the PTO (or PTOs) must be independent of the transmission, and hence have a speed and a control of its (their) own.

As will be seen in what follows with reference to FIGS. 4 to 8, the shafts designed for transmission of motion to the front wheels and the one (or ones) for the PTO (or PTOs) have to co-exist physically with the perpendicular scheme of transmission in question. In effect, driven by the engine M (see in particular FIG. 4) are two distinct coaxial shafts 40, 41. The external shaft 40 drives the transmission 100, as described previously with reference to FIGS. 1 to 3, preferably by means of the clutch 34. The internal shaft 41, instead, without necessarily the interposition of a clutch of its own, controls transmission of power to the shaft of the PTO (see hereinafter).

The shaft 41 carries at its own end a gear wheel 42, which meshes with a gear wheel 43 fitted on a shaft 44, the line of axis of which is located underneath the line of axis of the shaft 40.

Figure 5:
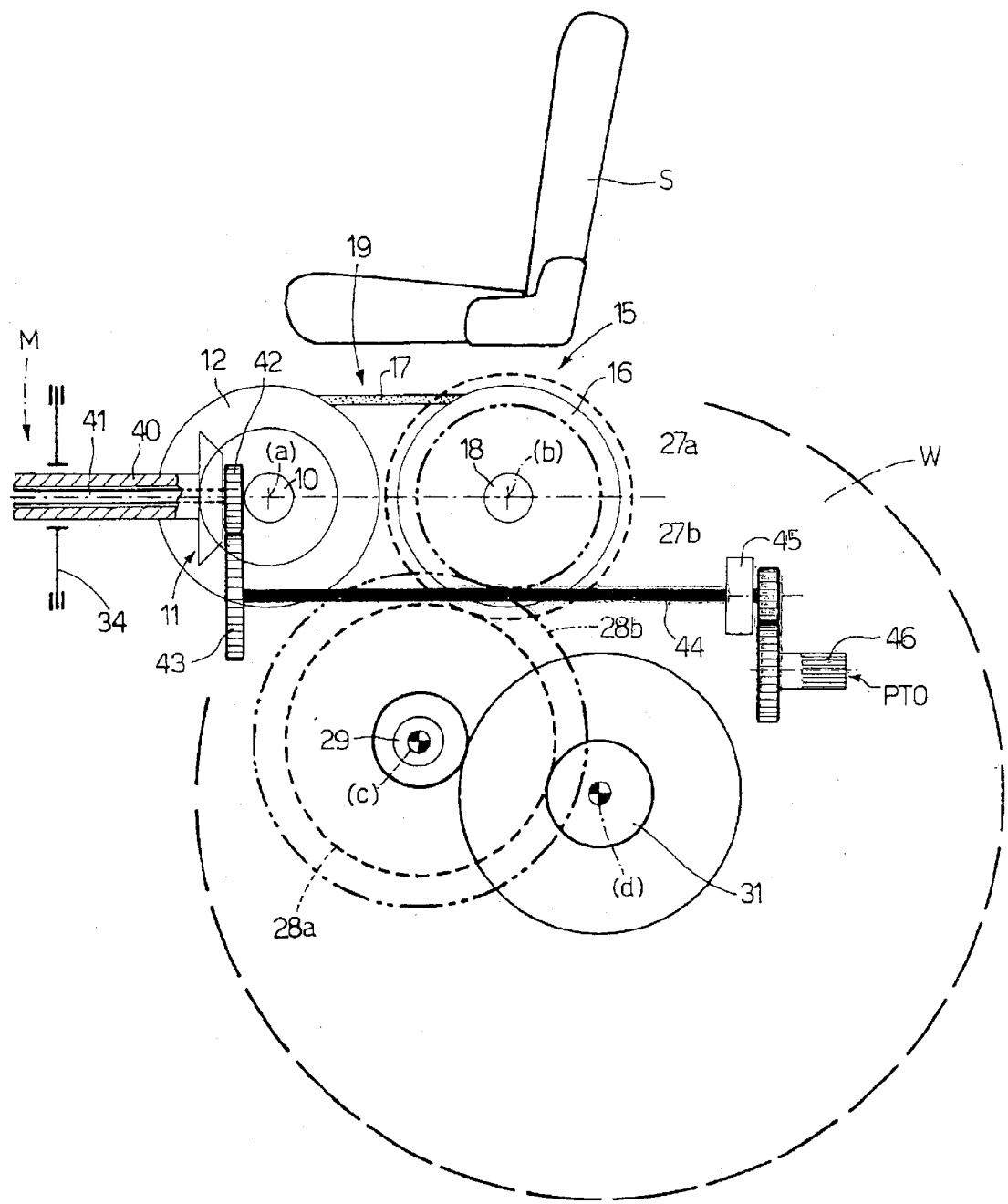
FIG. 5 illustrates a side view of the transmission of FIG. 4.
Figure 6:
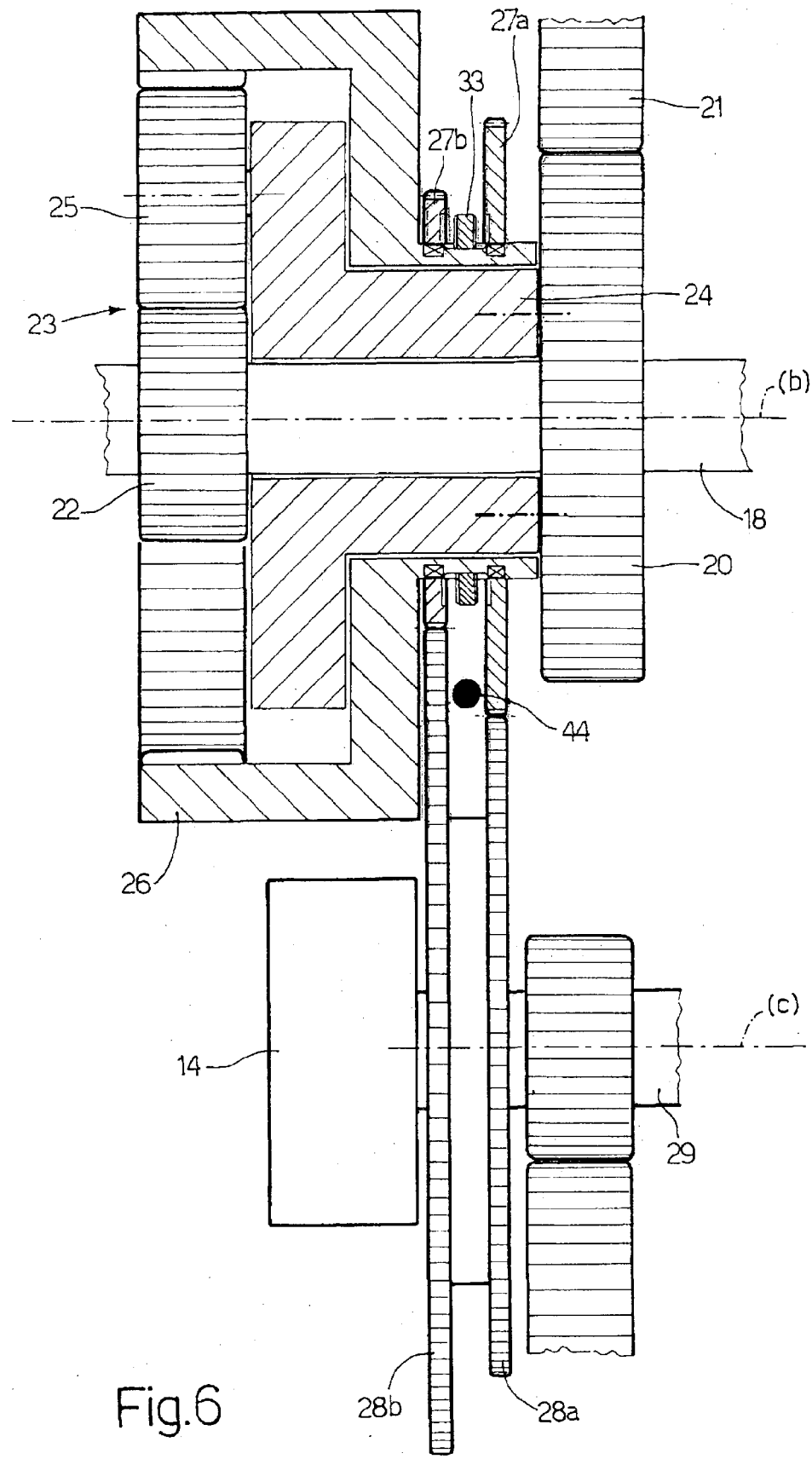
FIG. 6 illustrates a front view of the transmission of FIG. 4.
Figure 7:
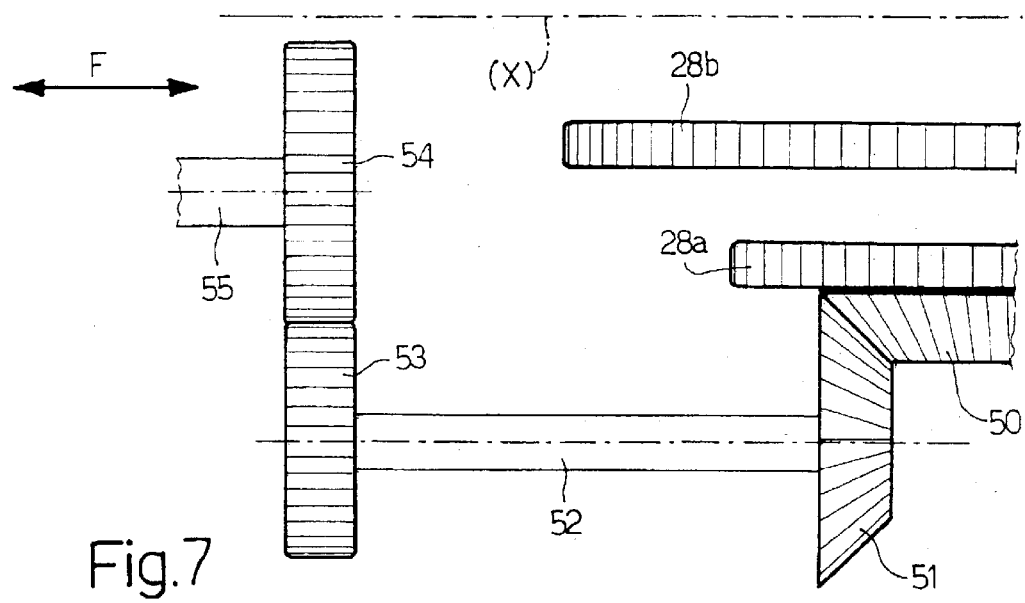
FIG. 7 illustrates a plan view of a four-wheel drive.

The shaft 44 drives, by means of a clutch 45, the shaft 46 of the rear PTO, passing in the space available between the gear wheels 28a and 28b of the differential 14 (FIGS. 5 and 6). As regards the four-wheel drive, this will now be described with reference to FIGS. 7 and 8.

The gear wheel 28a carries fixed to it a crown bevel gear 50, which engages with a pinion gear 51 that transmits the motion, by means of the shaft 52 and a pair of gear wheels 53, 54, to the shaft 55, to which is connected the front-wheel-drive system (not illustrated).

The shaft 52 is parallel to the central axis X of the motor vehicle, but is positioned towards the outside of the transmission housing.

Figure 8:
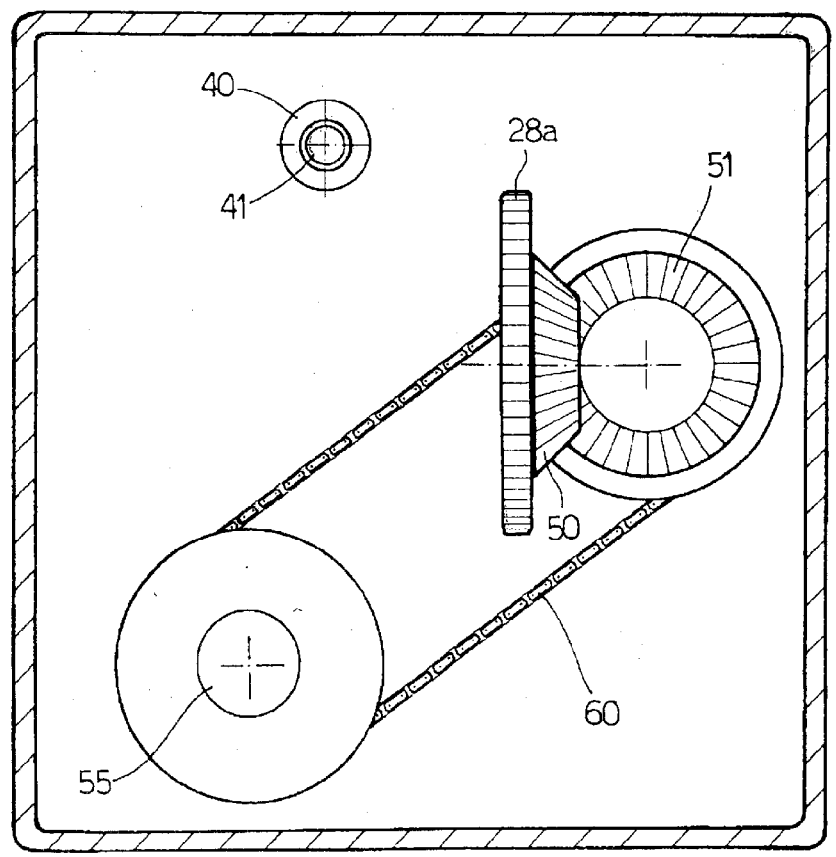
FIG. 8 illustrates a front view of a way that is alternative to the one illustrated in FIG. 7 for building a four-wheel drive.

FIG. 8 illustrates a further embodiment of the four-wheel drive, in which the motion is transferred from the pinion gear 51 to the shaft 55 by means of a chain 60.

Operation of the transmission is easily deducible from what has been said previously and consequently will not be explained in detail.

It will be obvious to those skilled in the art that various changes may be made without departing from the scope of the invention and the invention is not to be considered limited to what is illustrated in the drawings and described in the specification.

What is claimed is:

1. A CVT transmission for a motor vehicle comprising equipment for continuous variation of motion in terms of torque and of speed delivered, said continuous variation being obtained between two shafts; said equipment for continuous variation of motion comprising first mechanical means with fixed transmission ratio, and second mechanical means for transmitting power with variable transmission ratio, there being set between said first mechanical means and said second mechanical means an epicyclic gear train including a central gear fitted on a driven one of said shafts, whilst said first mechanical means drive a spider carrying a plurality of planetary gears, said planetary gears including teeth meshed with internal teeth of a crown gear, a speed of said crown gear being an algebraic sum of the speeds of a gear wheel fitted on said driven one of said shafts and of said first mechanical means driving said spider; said CVT transmission being characterised in that input of motion from an engine connected in rotatably driving relation thereto occurs about an axis substantially parallel to an axis of longitudinal symmetry of the motor vehicle, whilst axes of said shafts, respectively, are set transverse to said axis of longitudinal symmetry of the motor vehicle; the transmission being connectable in driving relation to a differential having an axis of longitudinal symmetry transverse to said axis of longitudinal symmetry of the motor vehicle and substantially parallel to the axes of said shafts, wherein at least one pair of gear wheels, fixed to said crown gear, is meshed with a pair of gear wheels of the differential rotatable about the axis of longitudinal symmetry of said differential, in which a transmission ratio between said transmission and said differential can be selected by means of a sliding toothed shaft coupling and by means of a servo control.

2. The CVT transmission as claimed in claim 1, in which the variable transmission ratio obtained by means of said second mechanical means is controlled by a group selected from hydraulic, mechanical and electrical means.

3. The CVT transmission as claimed in claim 1, in which said sliding toothed shaft coupling envisages a neutral position.

4. The CVT transmission as claimed in claim 3, in which an input shaft of the motion from said engine to said transmission is provided with a clutch.

5. The CVT transmission as claimed in claim 4, in which said clutch performs also the functions of a torque-limiter coupling.

6. The CVT transmission as claimed in claim 5, in which said engine drives two coaxial shafts, said external shaft driving said transmission, whilst said internal shaft drives a series of shafts of a power take-off (PTO).

7. The CVT transmission as claimed in claim 6, in which said shaft of the power take-off (PTO) is provided with a clutch.

8. The CVT transmission as claimed in claim 6, in which said shaft passes in the space between said gear wheels of said differential.

9. The CVT transmission as claimed in claim 1, in which one of said gear wheels carries fixed to it a crown bevel gear which meshes with a pinion gear, which transmits the motion to front wheels of the motor vehicle by means of mechanical transmission means.

10. The CVT transmission as claimed in claim 1, in which said axes and an axis of the gear shafts of the rear wheels are arrange spatially substantially in the form of a quincunx.

11. The CVT transmission as claimed in claim 1, in which the elements that make up said equipment for continuous variation of the motion are mounted in cantilever fashion on said shafts, so as to be housed in two guards separated from one another and easily accessible from outside.

12. The CVT transmission as claimed in claim 11, in which said second mechanical means are housed in a first guard, whilst said first mechanical means and said epicyclic gear train are housed in a second guard.

13. The CVT transmission as claimed in claim 12, in which said shafts are supported by bearings set on a wall of said first guard, said wall facing said second guard.

14. The CVT transmission as claimed in claim 1, in which provided on at least one of said shafts is a torque-limiting device.

15. A CVT transmission for agricultural tractors, comprising equipment for continuous variation of motion in terms of torque and of speed delivered, said continuous variation being obtained between two shafts; said equipment for continuous variation of motion comprising first mechanical means having a fixed transmission ratio, and second mechanical means for transmitting power having a variable transmission ratio, there being set between said first mechanical means and said second mechanical means an epicyclic gear train; said CVT transmission being mountable on a tractor such that input of motion from an engine of the tractor occurs in a direction that is substantially transverse with respect to an axis of longitudinal symmetry thereof; the epicyclic gear train including a central gear fitted on a driven one of said shafts, and said first mechanical means drive a spider carrying a plurality of planetary gears including teeth meshed with internal teeth of a crown gear carried on said driven one of said shafts; the transmission being connectable in driving relation to a differential having an axis of longitudinal symmetry transverse to said axis of longitudinal symmetry of the tractor and substantially parallel the axes of said shafts, wherein at least one pair of gear wheels carried on said crown gear, is meshed with a pair of gear wheels of the differential rotatable about the axis of longitudinal symmetry of said differential, in which a transmission ratio between said transmission and said differential can be selected by sliding a toothed shaft coupling carried on said crown gear into engagement with one of the gears carried on said crown gear by means of a servo control.

16. A CVT transmission for motor vehicles, said CVT transmission comprising equipment for continuous variation of the motion in terms of torque and of speeds delivered, said continuous variation being obtained between two shafts; said equipment for continuous variation of the motion comprising first mechanical means with a fixed transmission ratio, and second mechanical means for transmitting power with a variable transmission ratio, there being set between said first mechanical means and said second mechanical means an epicyclic gear train and in which input of motion from an engine occurs in a direction that is substantially parallel to an axis of longitudinal symmetry of the motor vehicle, whilst the axes, of said shafts are transverse with respect to said axis of longitudinal symmetry of the motor vehicle; the epicyclic gear train including a central gear mounted on a driven one of said shafts for rotation herewith, and said first mechanical means drive a spider carrying a plurality of planetary gears including teeth meshed with the central gear and internal teeth of a crown gear carried on said driven one of said shafts; and a differential having an axis of longitudinal symmetry transverse to said axis of longitudinal symmetry of the vehicle and substantially parallel to the axes of said shafts, at least one pair of gear wheels being carried on said crown gear and meshed with a pair of gear wheels of the differential rotatable about the axis of longitudinal symmetry thereof, in which a transmission ratio between said transmission and said differential can be selected by sliding a toothed shaft coupling carried on said crown gear into engagement with one of the gears carried thereon by means of a servo control.

* * * * *